May 6, 1952     L. A. PARADISE     2,595,601
BEARING AND LUBRICATION THEREOF
Filed Dec. 22, 1948     2 SHEETS—SHEET 1
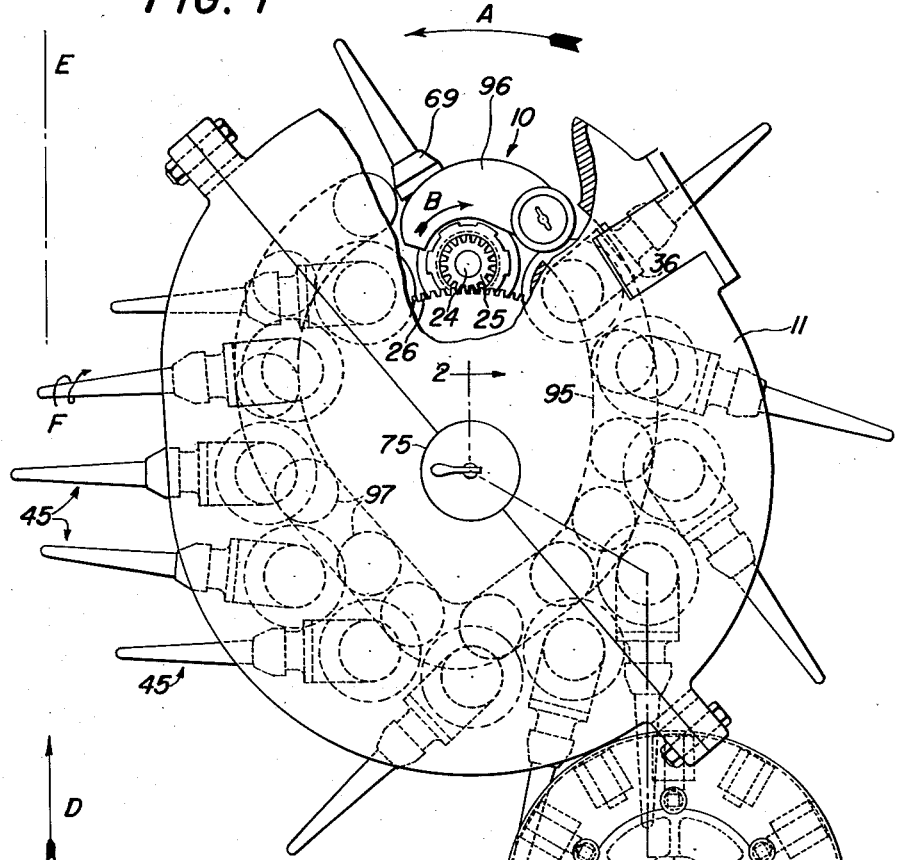
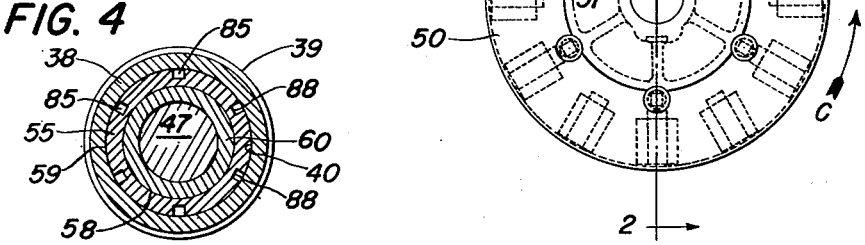
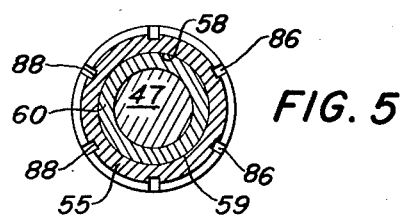
INVENTOR.
L. A. PARADISE
ATTORNEYS May 6, 1952  L. A. PARADISE  2,595,601
BEARING AND LUBRICATION THEREOF
Filed Dec. 22, 1948  2 SHEETS—SHEET 2

INVENTOR.
L. A. PARADISE
BY
ATTORNEYS

Patented May 6, 1952

2,595,601

UNITED STATES PATENT OFFICE 2,595,601

BEARING AND LUBRICATION THEREOF

Louis A. Paradise, Moline, Ill., assignor to Deere & Company, Moline, Ill., a corporation of Illinois Application December 22, 1948, Serial No. 66,649

4 Claims. (Cl. 308—121)

This invention relates to an improved bearing and lubricating means therefor. More particularly, the invention relates to lubrication of a bearing on a shaft or the like that is inclined to the horizontal.

The invention in its preferred form has application primarily to mechanism such as that found in a cotton picker of a type currently known, the picking unit of which comprises a rotatable drum made up of a plurality of circumferentially spaced vertical supports or columns, each of which carries a vertical shaft for driving a plurality of vertically spaced picking spindles which project generally radially outwardly of the drum. Each spindle is in the form of an elongated member having a generally conical outer periphery formed about the axis of rotation of the spindle. It is an object of such picker construction to dispose the upper element of the cone that forms the picking spindle surface in a horizontal plane, which requires that the axis of rotation of the spindle be inclined slightly upwardly from the horizontal.

The picker drum assembly of the type referred to is ordinarily lubricated by means that supplies lubricant to the vertical columns and ultimately to the bearing surfaces on which the spindles are carried for rotation. In view of the upward inclination of the spindle axes, it is found that a simple form of lubricating means is inadequate in most cases, since lubricant fails to reach radially outermost portions of the spindle-bearing surfaces. Since the spindles rotate at relatively high speeds and are subjected to both radial and thrust loading, the bearing surfaces are soon subjected to considerable wear, whereupon the spindles become misaligned and wobble and the picking efficiency thereof drops off.

According to the present invention, the lubricating means is improved by the provision of a bearing having lubricant-supply passages or grooves arranged in such manner that lubricant can be fed at least in part by gravity to the radially outermost portions of the spindle-bearing surfaces. A more specific object of the invention resides in the provision of an improved bearing assembly made up of bushings or bearings of the lubricant-permeable type and to provide the lubricant passages or grooves in the outer or mounting surfaces thereof. This object of the invention is contemplated broadly apart from the specific cotton picker structure referred to above.

The foregoing and other important objects and desirable features inherent in and encompassed by the invention will become apparent as a preferred form of the invention is completely disclosed in the following detailed description and accompanying sheets of drawings in which:

Figure 1 is a plan view of that portion of a cotton picker showing the picker unit or drum as associated with a doffer;

Figure 4 is a transverse sectional view taken on the line 4—4 of Figure 3; and

Figure 5 is a transverse sectional view taken on the line 5—5 of Figure 3.

Figure 2:
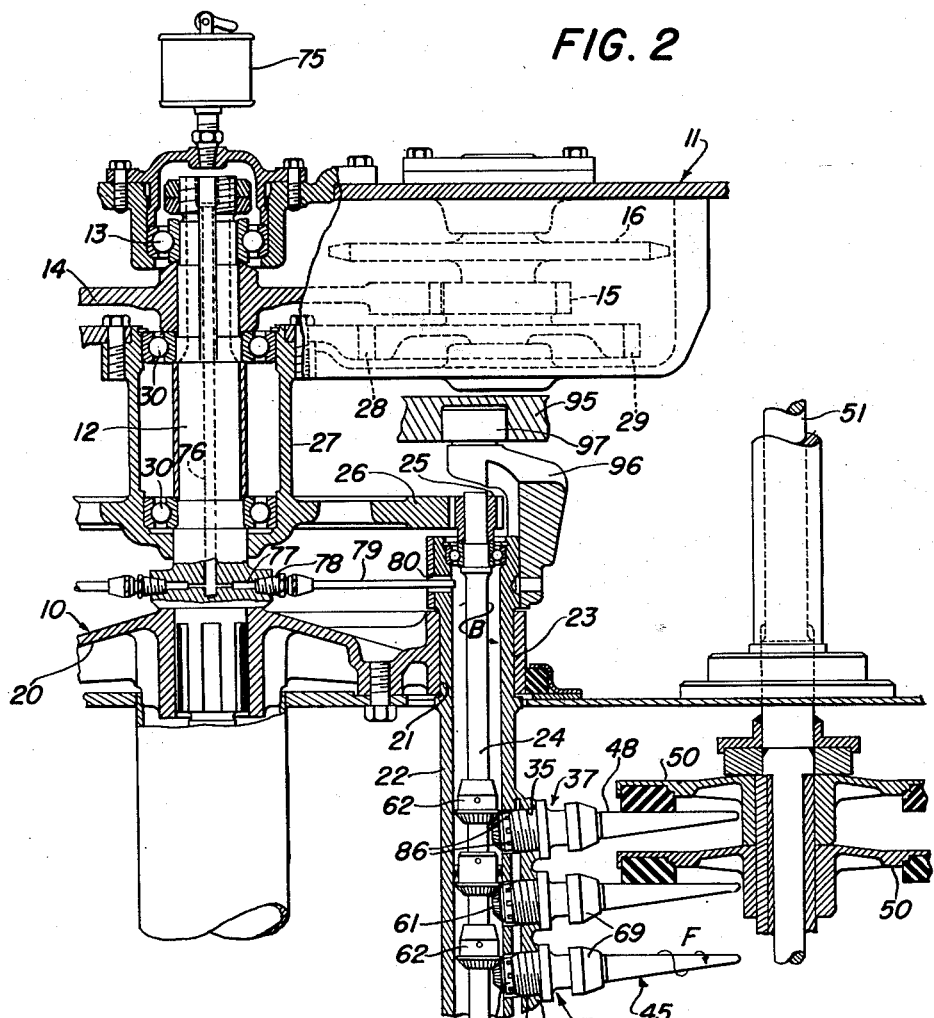
Figure 2 is a sectional view of the structure shown in Figure 1, the view being taken substantially along the line 2—2 of Figure 1.

The picker construction illustrated by way of example is typical of many already known to those versed in the art; hence, only such related portions thereof are illustrated as are deemed necessary to an understanding of the broader aspects of the invention and the specific application of the invention to the picker structure.

In the drawings, the numeral 10 designates generally the picker unit or drum which is suspended from a carrier or supporting casing 11 for rotation about a vertical axis. The drum includes a vertical shaft 12, the upper end of which is journaled in a bearing 13 in part of the casing 11. In a conventional structure, the lower end of the shaft will be journaled in a suitable bearing, omitted from the disclosure here. The shaft 12 is provided adjacent the bearing 13 with a keyed or splined end to which is fixed a driven gear 14. This gear is in constant mesh with and is driven by a gear 15 forming part of a gear cluster approximately journaled in the supporting casing 11. The numeral 16 indicates a sprocket, which comprise part of means for delivering power to the drum unit. Ordinarily, the drum unit will be mounted with one or more similar units on a mobile frame, such as a tractor or similar vehicle, and will be supplied with power from the source of power on the vehicle. These details are unimportant here.

The drum includes at its upper end a generally circular casting 20 in which is provided a plurality of circumferentially spaced apertures 21, within each of which is carried a vertical support or column 22, only one of which appears in section in Figure 2. Each column is carried for oscillation or angular movement about a vertical axis, by means of cooperative bearing surfaces at 23; and each column is hollow or tubular to contain a vertical shaft 24.

Each of the shafts 24 projects upwardly beyond the upper portion of its respective column 22 and is provided with a pinion 25 which is keyed or otherwise fixed thereto for rotation therewith. These pinions are in mesh with and driven by a relatively large gear 26 fixed to a rotatable member 27 concentric with the driven shaft 12. The member 27 carries a second gear 28 which is in constant mesh with and driven by a gear 29 forming part of the gear cluster previously described as including the gear or pinion 15 and the sprocket 16. From the description thus far it will be seen that the drum 10 is rotated about its axis by the shaft 12; simultaneously, the shafts 24 are rotated. It will be obvious that the speed of rotation of each shaft 24 is relatively greater than that of the rotation of the drum unit as a whole. The direction of rotation of the drum unit is indicated by the arrow A in Figure 1. The direction of rotation of the shafts 24 is indicated at B in Figures 1 and 2. The member 27 is apropriately journaled on the shaft 12, as by a pair of axially spaced bearings 30.

Each of the columns or supports 22 is provided with a plurality of outwardly opening, internally threaded apertures 35. The axis of each aperture is substantially a radius of the vertical axis of the shaft 12, but each axis is inclined slightly upwardly from the horizontal. In the instance illustrated, the angle of inclination to the horizontal is 3° 32'. It will be understood, of course, that the specific angle shown and described is peculiar to the structure illustrated and is not to be taken as in any way limiting the invention.

The column or support 22 is enlarged in the vicinity of each aperture 35 to provide a supporting portion 36, and each aperture 35 receives a bearing assembly designated generally by the numeral 37. Each assembly includes a supporting or mounting member in the form of a sleeve 38 which has an externally threaded inner end 39 screw-threaded into a respective internally threaded aperture 35. It will be understood, of course, that any other suitable mounting could be utilized.

Since each member 38 is in the form of a sleeve, it is necessarily tubular and includes an interior surface 40, which is cylindrical. The interior surface 40 could be other than cylindrical, if desired.

Each bearing assembly 37 provides means for supporting or journaling a rotatable member which here takes the form of a picker spindle, designated generally by the numeral 45. Each spindle has an inner end in the form of a cylindrical shank 46 which may be formed integral with a reduced shank 47. The portion 46 presents an outer cylindrical bearing surface, the outside diameter of which is considerably less than the inside diameter of the interior cylindrical surface 40 of the member or sleeve 38, whereby the surface 40 loosely surrounds the shank portions 46 and 47. The outer end of each spindle is elongated and is in the form of a cone about the axis of rotation of the spindle, each spindle thus having an outer conical surface 48 on which appropriate picking teeth (not shown) may be provided. The inclination of the axis of rotation of the spindles to the horizontal, as illustrated, places the upper surface portion or element of each conical surface 48 in a substantially horizontal plane, a structural characteristic that is common to certain pickers of the type familiar to those versed in the art. The peculiar disposition of the spindles has been adopted for the purpose of obtaining improved cooperation with doffer mechanism, a representation of which is illustrated in the present instance as including a plurality of doffers 50 which are carried for rotation on and with a vertical shaft 51. This shaft may be driven from the same source that drives the sprocket 16, previously described.

In operation, the spindles 45 pick cotton from the plants and move toward the doffers 50 as shown in Figure 1. The direction of rotation of the doffers is shown at C in Figure 1, from which it will be apparent that the doffers wipe the spindles from the base to the tip of the conical outer surfaces 48 thereof. The carrying structure on which the picker unit is mounted moves in the direction of the arrow D in Figure 1 along a row of cotton represented schematically by the letter E in Figure 1. The operation of the picker in this respect will be assumed to be familiar and no further details thereof will be set forth.

Each spindle 45 is journaled by means of the cylindrical bearing surface on its shank portion 46 on bushing or bearing means preferably comprising an inner part 55 and an outer part 56.

The bushings 55 and 56 are preferably of the lubricant-permeable type commercially known as "Oilite" bearings. In the present instance, the bushing 55 is in the form of a tube or sleeve having an exterior surface 57 and an interior surface 58, both of which are cylindrical, and the outer of which forms a mounting surface for the mounting of the bushing in the interior surface 40 of the supporting member or sleeve 38. The interior surface 58 is a bearing surface which cooperates with a cylindrical bearing surface 59 on a sleeve 60 which is fixed to the reduced shank portion 47 of the spindle 45. The sleeve 60 forms an integral part of a bevel pinion 61. The bevel pinions of the spindles mesh with and are driven by bevel pinions 62 pinned or otherwise fixed to the vertical shafts 24. The direction of rotation of the spindles is indicated by the arrows F in Figures 1 and 2.

The bushing 55 has an inner end portion formed as an annular flange 63, the inner radial face of which provides a thrust bearing surface 64 cooperative with the radial face formed at the junction of the pinion 61 and its sleeve portion 60.

The bushing 56, like the bushing 55, is in the form of a sleeve having an exterior surface 65 and an interior surface 66, both of which are cylindrical. The outer surface 65 provides a mounting surface by means of which the bushing 56 is mounted in the sleeve or support member 38. The inner surface provides a bearing surface cooperative with the outer cylindrical surface of the shank portion 46, which latter surface is substantially the same diameter as the sleeve portion 60 of the pinion 61. The bushings 55 and 56 are non-rotatably carried by the sleeve 38 and the spindle is rotatable in the bushings.

The outer end portion of the bushing 56 is provided as an annular flange 67 having a radial outer face 68 which provides a thrust bearing surface for an inner radial face portion on a cap 69. This cap is pinned at 70 to the spindle 45 and is interiorly recessed at 71 to encircle the annular flange 67 and the outer end portion of the sleeve 38.

The means for supplying lubricant to the mechanism just described comprises a lubricant source in the form of an oiler 75, or other suitable container, carried by the supporting casing 11 above and in coaxial alignment with the vertical shaft 12. The shaft 12 is drilled axially to provide a passage 76 which extends to a point just above the drum 10. At this point, the passage 76 is connected with a plurality of radially extending passages 77, the outer end portion of each of which is suitably tapped to receive a fitting 78. A supply or distributing pipe 79 is connected to each fitting and extends radially outwardly to enter a slot 80 in a respective column 22. Since the column 22 is hollow or tubular, the interior thereof forms a lubricant-receiving chamber or portion to which lubricant is delivered by the means just described.

Lubricant is supplied by the oiler 75 to the lubricating means in relatively small quantities and the lubricant passes by gravity to the lower end of the drilled passage 76, whence it is distributed radially outwardly because of rotation of the drum 10. Small quantities of lubricant thus discharged from the supply pipes 79 into the chambers of the columns 22 will move downwardly by gravity through these columns and will be distributed over the pinions 62 and thence to the pinions 61. Since the parts are rotating at relatively high speeds, the lubricant in the interior chamber of the columns 22 will be in the form of a mist; and only such quantities of lubricant are supplied as are adequate for lubricating purposes without excessive flooding of the parts. Flooding must be avoided to eliminate the possibility of the escape of excessive lubricant axially of the spindles 45, since it is important to prevent lubricant from escaping to points where it will accumulate on the cotton being picked. Hence, there is a relatively delicate problem of lubricant control, the solution of which depends upon securing the proper amount of lubricant for the outer bearing or bushing 56 without permitting over-lubrication.

According to the present invention, lubrication of each bearing assembly 37 is accomplished by the provision of appropriate passages or grooves or other lubricant-transfer means. As illustrated, the inner part of the bearing assembly 37 is provided with lubricant-transfer means along the contacting surfaces 40 and 57. Preferably, this means includes a plurality of grooves 85 extending lengthwise of the outer surface 57 of the bushing 55. These grooves are circumferentially spaced about the bushing, as shown in Figure 4.

The inner end of each groove 85 extends into or communicates with a pocket 86 provided in the flange 63 of the bushing and opening radially outwardly thereof. As shown in Figure 5, the pockets 86 are circumferentially spaced on the order of the circumferential spacing of the grooves 85. The pockets or slots 86 are in proximity to the pinions 61 and thus in a position to pick up lubricant from the hollow interior of the column 22. In this particular case, the bushing 55 is non-rotatable in the sleeve 38; hence, the uppermost pockets 86 comprise inner-end lubricant-receiving means for receiving lubricant from the interior of the column or support 22. This lubricant may be transferred radially outwardly, or axially of the bearing assembly 37, by means of the grooves 85.

Figure 3:
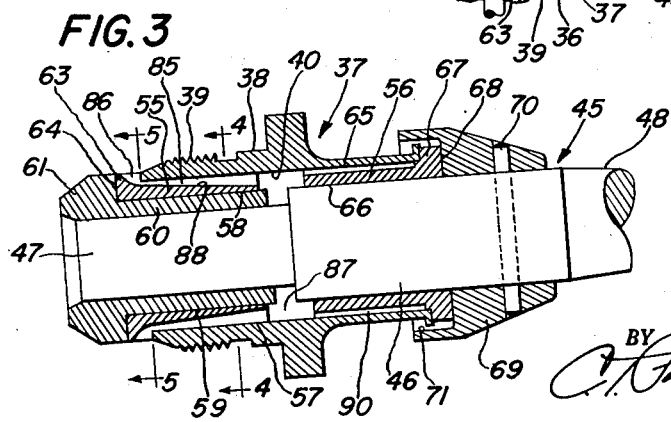
Figure 3 is an enlarged view, in section, showing the mounting or bearing assembly in greater detail.

As best shown in Figure 3, the proximate unflanged ends of the bushings 55 and 56 are spaced axially apart so that there is provided in the bearing assembly 37, a lubricant-receiving means in the form of an annular pocket or recess 87, the exterior portion of which recess is defined by the intermediate portion of the inner cylindrical surface 40 of sleeve 38 and the interior portion of the recess being defined by the outer cylindrical surface portions of the shank portions 46 and 47. This pocket provides, as will be seen below, a lubricant-control means.

For the purpose of further facilitating the transfer of lubricant from the inner to the outer end portion of the bushing 55, the grooves 85 are so formed that their bottoms, as at 88, are inclined to the horizontal on an angle opposite to the angle of inclination of the spindle axis. In the installation illustrated, the top groove 85 (as considered in Figure 3) will be mainly relied upon to transfer lubricant from the pocket 86 to the pocket 87, since the bottom of the uppermost groove will be the one that is inclined to the horizontal as aforesaid. Hence, there is eliminated the problem of transferring lubricant uphill. Since the bushing 55 is of the lubricant-permeable type, some of the lubricant that enters the grooves or passages 85 will permeate the bushing to lubricate the cylindrical bearing surface 58.

The bushing 56 is likewise provided about its outer surface with a plurality of lengthwise grooves 90 preferably circumferentially spaced about the bushing. Each of these grooves or passages is in communication with the annular pocket or recess 87 and extends lengthwise of the bushing 56 to a point, preferably, short of actual direct communication with the outer thrust surface 68. It will be realized, of course, that these details can be varied according to the requirements of a particular installation. In the present case, it is found that sufficient lubricant can be supplied to the bearing surface at 66 and to the thrust surface at 68 by virtue of the permeability of the bushing 56. A direct communication between the grooves 90 and the thrust bearing surface 68 would result in the delivery of an excess supply of lubricant. In operation, lubricant will be primarily supplied through the uppermost passage 85 in the bushing 55 and will drop downwardly to the bottom of the annular recess or pocket 87, whence it will travel outwardly primarily through the lowermost groove or passage 90 in the bushing 56. It will be noted that the passage comprising the components 85, 87 and 90 is tortuous, thus imposing some measure of control on the supply of lubricant to the outer portion of the spindle bearing surface. Since the bushing 56 is non-rotatably carried by the sleeve 38, its position is fixed, and the lowermost grooves 90 comprise outer-end lubricant-receiving means at the outer end of the bearing and at a level lower than the level of the uppermost pockets 86 at the inner end of the bearing. This arrangement is important in the present case when it is considered that the drum 10 has rotational or orbital movement, wherein the parts, and the lubricant associated therewith, are subject to considerable centrifugal force.

In the particular picker illustrated, the columns 22, and the spindles carried thereby, are subjected to further forces tending to throw the lubricant axially outwardly of the spindles. The mounting of the columns is such that, during rotation of the drum 10, the columns are oscillated about their vertical axes by means of a cam track 95 provided on an under portion of the carrier casing 11. Each column 22 is connected by means of a crank 96 (Figure 1) to a roller 97 which follows the cam track 95. Such arrangement is largely conventional in the type of picker shown and is therefore illustrated and described only generally here.

As previously stated, it is theoretically probable that the lubricating of each bearing assembly 37 will be handled primarily by the uppermost groove 85 in the bushing 55 and the lowermost groove 90 in the bushing 56. It is therefore quite likely that each bushing could be provided with the single groove or passage mentioned. However, such characteristic would require care in the assembly of the parts to insure that the single groove on the inner bushing would always be at the top and the single groove in the outer bushing would always be at the bottom. Such care and assembly is quite inconsistent with the probabilities of mass production. Further, the relationship between the two grooves and the relationship thereof to the vertical columns 22 would be affected by the degree to which the bearing assembly 37 was tightened when threaded into the internally threaded aperture 35. Therefore, it is more feasible to provide each bushing with the plurality of grooves or passages so that one or the other of the plurality of grooves in each bushing will be at or nearly at the desired location.

Although, as previously stated, the particular bearing assembly illustrated and described here was designed primarily for installation in a cotton picker unit of the type illustrated, it will be obvious that the invention has wider application. Various other features of the invention will be available regardless of the particular application. Other features and advantages of the invention not specifically pointed out above will undoubtedly occur to those versed in the art, as will various modifications and alterations in the preferred form of the invention illustrated, all of which may be achieved without departing from the spirit and scope of the appended claims.

What is claimed is:

1. A bearing, comprising: a hollow cylindrical portion having inner and outer cylindrical surfaces; an annular radial flange concentric on the cylindrical portion; means including a plurality of circumferentially spaced grooves in and running lengthwise of the outer cylindrical surface; and means including a plurality of circumferentially spaced radial grooves in the flange, certain of said radial grooves joining certain of said lengthwise grooves.

2. A bearing assembly, comprising: a support having a cylindrical, generally horizontal bore therein; a rotatable member having its axis of rotation coincident with the axis of said cylindrical bore and including an exterior cylindrical bearing surface concentrically within and loosely encircled by said bore; a pair of coaxial, tubular bushings having outer cylindrical surfaces fitting the bore, and interior cylindrical bearing surfaces journaling the rotatable member via its bearing surface, said bushings having proximate end portions coaxially spaced apart within the bore to provide an annular recess defined by said end portions and by a portion of the interior of the bore and a portion of the exterior bearing surface of said member; means providing a plurality of grooves lengthwise of the outer surface of one bushing and leading to the annular recess, certain of said grooves being generally along the upper part of the outer surface of said bushing and having bottoms inclined downwardly as they approach the recess; and means providing a groove generally lengthwise of and along a lower part of the outer surface of the other bushing and leading away from the annular recess.

3. In a cotton picker drum unit of the type including a support movable generally in a horizontal orbit and provided with a lubricant-receiving portion in communication with an outwardly opening apertured portion through which a picker spindle projects for rotation about a generally horizontal axis, such spindle having a picking part exterior to the support and an inner part provided with a cylindrical bearing surface formed about said axis of rotation and within the apertured portion of the support, the improvement comprising: a bearing concentrically surrounding the spindle rotating axis and having an outer portion for mounting in said apertured portion of the support and an interior cylindrical bearing surface receiving the spindle bearing surface, said bearing having an inner end proximate to and an outer end remote from the lubricant-receiving portion of the support; means at the inner end of the bearing in proximity to and for receiving lubricant from the lubricant-receiving portion of the support; means adjacent the outer end of the bearing, at a level lower than that of the inner end means, for receiving lubricant; and lubricant-transfer means in the bearing including a reservoir intermediate the ends of the bearing, a plurality of circumferentially spaced passages or grooves extending generally axially outwardly and downwardly from the inner end means toward the reservoir, and a plurality of circumferentially spaced passages or grooves leading from the reservoir to the outer end means for effecting the transfer of lubricant from the inner end means to the outer end means.

4. A bearing, comprising: a hollow cylindrical portion having inner and outer cylindrical surfaces; an annular radial flange concentric on the cylindrical portion; means including a plurality of circumferentially spaced grooves in and running lengthwise of the outer cylindrical surface, the bottom of certain of said lengthwise grooves being at an angle to the axis of said inner cylindrical surface; and means including a plurality of circumferentially spaced radial grooves in the flange, certain of said radial grooves joining certain of said lengthwise grooves.

LOUIS A. PARADISE.

REFERENCES CITED

The following references are of record in the file of this patent:

UNITED STATES PATENTS

| Number | Name | Date |
|---|---|---|
| 1,386,962 | Sharp | Aug. 9, 1921 |
| 1,634,768 | Bonner | July 5, 1927 |
| 1,769,030 | Lassen | July 1, 1930 |
| 2,440,767 | Baker | May 4, 1948 |